United States Patent
Nam et al.

(10) Patent No.: US 12,172,895 B2
(45) Date of Patent: Dec. 24, 2024

(54) COMBINED REFORMING APPARATUS

(71) Applicant: DOOSAN ENERBILITY CO., LTD, Changwon (KR)

(72) Inventors: Gyeong Mo Nam, Yongin (KR); Bong Keun Kim, Yongin (KR); Su Nam You, Yongin (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 507 days.

(21) Appl. No.: 17/548,574

(22) Filed: Dec. 12, 2021

(65) Prior Publication Data
US 2023/0104475 A1 Apr. 6, 2023

(30) Foreign Application Priority Data
Oct. 6, 2021 (KR) .................. 10-2021-0132414

(51) Int. Cl.
*C01B 3/38* (2006.01)
*B01J 8/06* (2006.01)

(52) U.S. Cl.
CPC ............... *C01B 3/384* (2013.01); *B01J 8/062* (2013.01); *B01J 8/065* (2013.01); *C01B 3/382* (2013.01);
(Continued)

(58) Field of Classification Search
CPC . C01B 3/384; C01B 3/382; C01B 2203/0233; C01B 2203/0238; C01B 2203/0244; C01B 2203/0816; C01B 2203/1017; C01B 2203/1241; C01B 2203/1058; C01B 2203/142; C01B 3/38; C01B 2203/1235; C01B 2203/1258;
(Continued)

(56) References Cited

U.S. PATENT DOCUMENTS

2008/0247942 A1* 10/2008 Kandziora ............... B01J 8/062
422/198
2015/0098872 A1* 4/2015 Kelly .................... B01J 19/242
422/310

FOREIGN PATENT DOCUMENTS

EP        1394103 B1 * 8/2007 .......... B01J 19/2485
KR   10-2004-0012890 A    2/2004

OTHER PUBLICATIONS

KR OA dated Mar. 8, 2023.

* cited by examiner

Primary Examiner — Anthony J Zimmer
Assistant Examiner — Syed T Iqbal
(74) Attorney, Agent, or Firm — Harvest IP Law, LLP (57) ABSTRACT

A combined reforming apparatus is provided. The combined reforming apparatus includes a body, a first catalyst tube disposed inside the body and reacting at a first temperature to reform hydrocarbons ($C_xH_y$) having two or more carbon atoms into methane ($CH_4$), a second catalyst tube disposed inside the body, connected to the first catalyst tube, and reacting at a second temperature higher than the first temperature to reform methane ($CH_4$) into synthesis gas comprising hydrogen ($H_2$) and carbon monoxide (CO), a combustion unit configured to supply heat to the first and second catalyst tubes, a gas supply pipe configured to supply hydrocarbon gas to the first catalyst tube, a first steam supply pipe configured to supply steam to the first catalyst tube, and a second steam supply pipe configured to supply steam to the second catalyst tube.

17 Claims, 7 Drawing Sheets

(52) U.S. Cl.
CPC ............... *B01J 2208/00893* (2013.01); *B01J 2208/00938* (2013.01); *B01J 2208/021* (2013.01); *B01J 2208/025* (2013.01); *B01J 2208/065* (2013.01); *C01B 2203/0233* (2013.01); *C01B 2203/0238* (2013.01); *C01B 2203/0244* (2013.01); *C01B 2203/0816* (2013.01); *C01B 2203/1017* (2013.01); *C01B 2203/1241* (2013.01)

(58) Field of Classification Search
CPC .. B01J 8/062; B01J 8/065; B01J 2208/00893; B01J 2208/00938; B01J 2208/021; B01J 2208/025; B01J 2208/065; B01J 8/0496; B01J 8/0449; B01J 2219/00157; B01J 8/0492; B01J 6/008; B01J 8/0465; C10J 2300/0946

See application file for complete search history.

COMBINED REFORMING APPARATUS

CROSS REFERENCE TO RELATED APPLICATION

This application claims priority to Korean Patent Application No. 10-2021-0132414, filed on Oct. 6, 2021, the disclosure of which is incorporated herein by reference in its entirety.

BACKGROUND

1. Field

Apparatuses and methods consistent with exemplary embodiments relate to a combined reforming apparatus, and more particularly, to a combined reforming apparatus including two or more catalyst tubes reacting at different temperatures to reform hydrocarbons ($C_xH_y$) having two or more carbon atoms into methane ($CH_4$) and to reform methane ($CH_4$) into synthesis gas composed of hydrogen ($H_2$) and carbon monoxide (CO).

2. Description of the Related Art

A related art steam methane reforming apparatus (SMR) is an apparatus for reforming natural gas containing methane ($CH_4$) as a main component. The related art steam methane reformer has a problem in that the structure and process are complicated because a preliminary reformer for reforming the high carbon-number hydrocarbons into methane is required when reforming a gas containing a hydrocarbon (CxHy) having a high carbon number.

SUMMARY

Aspects of one or more exemplary embodiments provide a combined reforming apparatus including two or more catalyst tubes reacting at different temperatures, thereby reforming hydrocarbons ($C_xH_y$) having two or more carbon atoms into methane ($CH_4$) and reforming methane ($CH_4$) into synthesis gas composed of hydrogen ($H_2$) and carbon monoxide (CO).

Additional aspects will be apparent in part in the description which follows and, in part, will become apparent from the description from the following description, or may be learned by practice of the exemplary embodiments.

According to an aspect of an exemplary embodiment, there is provided a combined reforming apparatus including: a body; a first catalyst tube disposed inside the body and reacting at a first temperature to reform hydrocarbons having two or more carbon atoms into methane ($CH_4$); a second catalyst tube disposed inside the body, connected to the first catalyst tube, and reacting at a second temperature higher than the first temperature to reform methane ($CH_4$) into synthesis gas comprising hydrogen ($H_2$) and carbon monoxide (CO); a combustion unit configured to supply heat to the first and second catalyst tubes; a gas supply pipe configured to supply hydrocarbon gas to the first catalyst tube; a first steam supply pipe configured to supply steam to the first catalyst tube; and a second steam supply pipe configured to supply steam to the second catalyst tube.

An amount of steam supplied to the first catalyst tube may be determined according to a content of hydrocarbons having two or more carbon atoms included in the hydrocarbon gas.

The hydrocarbon gas may be pyrolysis gas generated through pyrolysis of waste.

The first catalyst tube may have a U-curved portion.

The combined reforming apparatus may further include a third steam supply configured to supply steam to the first catalyst pipe in a flow direction of gas passing through the U-curved portion of the first catalyst tube.

The third steam supply pipe may be connected to an outlet side of the U curved portion of the first catalyst tube.

The U-curved portion may extend along a circumferential direction of the body.

The second steam supply pipe may be connected to the second catalyst tube, disposed in the body, and extend in a longitudinal direction of the body.

Combustion gas discharged from the combustion unit may be discharged through a center portion of the body.

The second catalyst tube may be radially more inner than the first catalyst tube.

The first catalyst tube and the second catalyst tube may be arranged in parallel along the longitudinal direction of the body, and a first wall extending from a first side of the body may be disposed between the first catalyst tube and the second catalyst tube.

A second wall extending from a second side of the body may be disposed more inward than the second catalyst tube.

The first catalyst tube may include a plurality of first catalyst tubes and the second catalyst tube may include a plurality of second catalyst tubes.

The plurality of second catalyst tubes may be arranged at intervals along a circumferential direction of the body, and the plurality of first catalyst tubes may be arranged to surround the plurality of second catalyst tubes.

The second steam supply pipe may include a plurality of second steam supply pipes alternately arranged with the plurality of first catalyst tubes.

The second steam supply pipe may extend in parallel with the first catalyst tube along the longitudinal direction of the body and may be connected to an inlet side of the second catalyst tube.

Steam supplied to the second catalyst tube may be heated by combustion gas and then supplied to the second catalyst tube.

According to one or more exemplary embodiments, since the combined reforming apparatus includes two or more catalyst tubes reacting at different temperatures, hydrocarbons ($C_xH_y$) having two or more carbon atoms can be reformed into methane ($CH_4$) and the methane ($CH_4$) can be reformed into synthesis gas composed of hydrogen ($H_2$) and carbon monoxide (CO) at the same time. Accordingly, there is no need to additionally install a preliminary reformer, thereby simplifying the structure and process for gas reforming.

In addition, instead of supplying steam required for reforming the hydrocarbon gas at once, only the amount of steam required for reforming is supplied to the first catalyst tube according to the content of hydrocarbons having two or more carbon atoms included in the hydrocarbon gas. This reduces the flow rate of the gas passing through the first catalyst tube and increases the retention time, thereby improving reforming efficiency.

Further, one or more exemplary embodiments can be used for reforming pyrolysis gas generated during pyrolysis of wastes, in which the pyrolysis gas contains a large amount of hydrocarbons having two or more carbon atoms.

BRIEF DESCRIPTION OF THE DRAWINGS

The above and other aspects will be more apparent from the following description of the exemplary embodiments with reference to the accompanying drawings, in which.

DETAILED DESCRIPTION

Various modifications and various embodiments will be described with reference to the accompanying drawings. However, it should be noted that the various embodiments are not for limiting the scope of the disclosure to the specific embodiment, but they should be interpreted to include all modifications, equivalents, or substitutions of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 1:
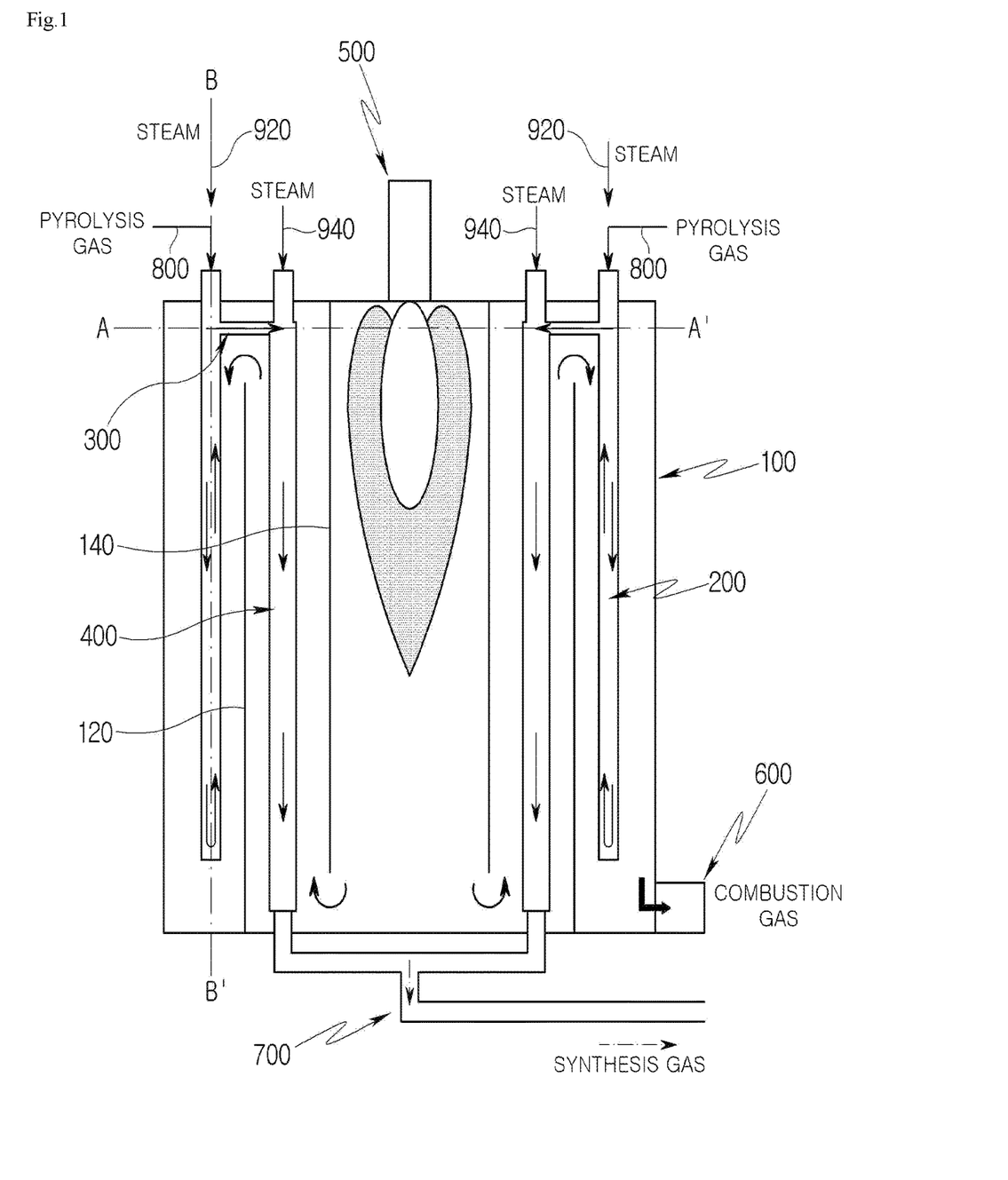
FIG. 1 is a cross-sectional view illustrating a combined reforming apparatus according to a first exemplary embodiment.
Figure 2:
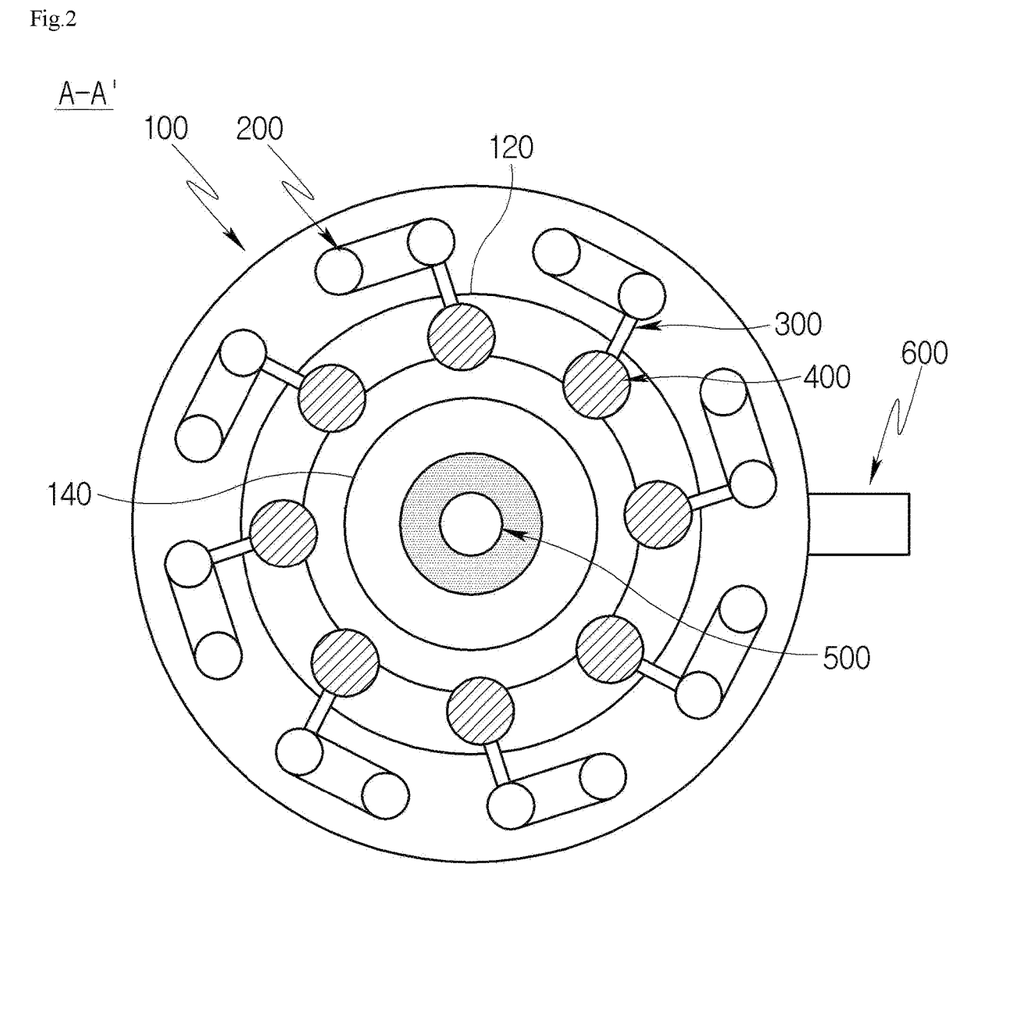
FIG. 2 is a cross-sectional view taken along line A-A' of FIG. 1.
Figure 3:
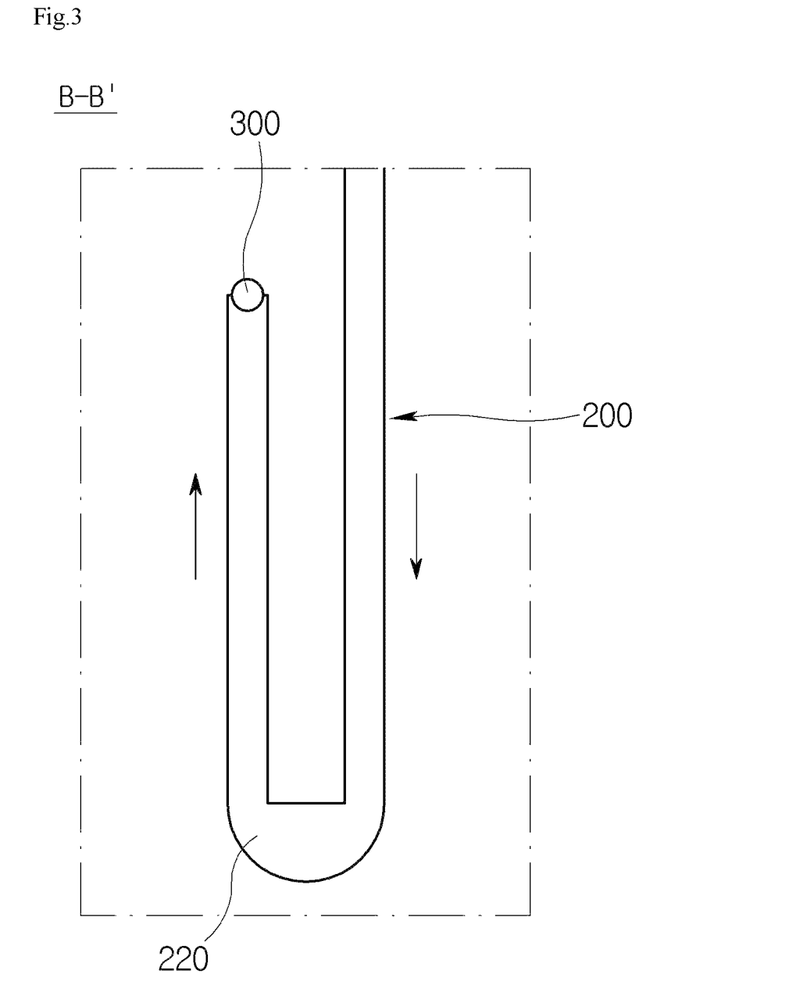
FIG. 3 is a cross-sectional view taken along line B-B' of FIG. 1.

Hereinafter, a combined reforming apparatus according to a first exemplary embodiment will be described with reference to FIGS. 1 to 3. FIG. 1 is a cross-sectional view illustrating a combined reforming apparatus according to a first exemplary embodiment. FIG. 2 is a cross-sectional view taken along line A-A' of FIG. 1. FIG. 3 is a cross-sectional view taken along line B-B' of FIG. 1.

Referring to FIGS. 1 to 3, a combined reforming apparatus includes a body 100, a first catalyst tube 200, an intermediate tube 300, a second catalyst tube 400, a combustion unit 500, a combustion gas discharge unit 600, a synthesis gas discharge unit 700, a gas supply pipe 800, a first steam supply pipe 920, and a second steam supply pipe 940.

The body 100 is formed in a cylindrical shape having an inner space to define an external shape of the combined reforming apparatus. However, it is understood that the shape of the body 100 is not limited to the cylindrical shape.

Two or more catalyst tubes containing different catalysts reacting at different temperatures are disposed in the body 100. For example, the first catalyst tube 200 is used to reform hydrocarbons ($C_xH_y$) having two or more carbon atoms into methane ($CH_4$) and the second catalyst tube 400 is used to reform methane ($CH_4$) into synthesis gas containing hydrogen ($H_2$) and carbon monoxide (CO). The first catalyst tube 200 reacts at a first temperature T1, and the second catalyst tube 400 reacts at a second temperature T2 higher than the first temperature T1.

The first temperature T1, which is the reaction temperature of the first catalyst tube 200, may be about 350° C. to 550° C., and a catalyst for reforming hydrocarbons having two or more carbon atoms is used. For example, a nickel-based catalyst using MgO or $Al_2O_3$ or a combination thereof as a support may be used for the first catalyst tube 200. Accordingly, in the first catalyst tube 200, higher hydrocarbons having two or more carbon atoms, such as ethane, propane, and butane, may be converted into methane, carbon monoxide, and hydrogen through reactions represented by Reaction Formulas 1 and 2 below.

$$C_nH_m + nH_2O \rightarrow nCO + (n+m/2)H_2 \quad \text{Reaction Formula 1:}$$

$$CO + 3H_2 \rightarrow CH_4 + H_2O \quad \text{Reaction Formula 2:}$$

The second temperature T2, which is the reaction temperature of the second catalyst tube 400, may be about 700° C. to 900° C., and a catalyst for reforming methane is used. Accordingly, a nickel-based catalyst may also be used for the second catalyst tube 400. For this reason, in the second catalyst tube 400, methane may be converted into synthesis gas mainly composed of hydrogen and carbon monoxide through a reaction represented by Reaction Formula 3 below.

$$CH_4 + H_2O \rightarrow CO + 3H_2 \quad \text{Reaction Formula 3:}$$

The first catalyst tube 200 and the second catalyst tube 400 are connected to each other through the intermediate tube 300. Hydrocarbon gas supplied to the first catalyst tube 200 through the gas supply pipe 800 connected to the first catalyst tube 200 sequentially flows through the first catalyst tube 200, the intermediate tube 300, and the second catalyst tube 400.

Accordingly, although the hydrocarbon gas supplied to the first catalyst tube 200 contains a large amount of hydrocarbons having two or more carbon atoms, the pyrolysis gas can be reformed into synthesis gas through steam reforming reactions while sequentially passing through the first catalyst tube 200 and the second catalyst tube 400. That is, higher hydrocarbons having two or more carbon atoms may be converted into methane while passing through the first catalyst tube 200, and methane may be converted into synthesis gas while passing through the second catalyst tube 400. Here, the hydrocarbon gas supplied to the first catalyst tube 200 may be a pyrolysis gas generated through pyrolysis of wastes. For example, the hydrocarbon gas may be a pyrolysis gas generated by pyrolysis of waste plastics, and may include a large amount of hydrocarbons having two or more carbon atoms.

The steam required for the steam reforming reaction in the first catalyst tube 200 and the second catalyst tube 400 is supplied to the first catalyst tube 200 and the second catalyst tube 400 through the first steam supply pipe 920 and the second steam supply pipe 940, respectively. That is, the entire steam required for reforming the hydrocarbon gas is not supplied to the first catalyst tube 200, but a portion of the steam is supplied to the first catalyst tube 200 and the remaining portion is supplied to the second catalyst tube 400. This reduces the flow rate of the gas passing through the first catalyst tube 200 and increases the retention time of the gas, thereby improving reforming efficiency.

The amount of steam supplied to the first catalyst tube 200 may be determined according to the content of hydrocarbons having two or more carbon atoms included in the hydrocarbon gas. For example, if 1 mol of ethane ($C_2H_6$) is contained in 1L of hydrocarbon gas, the amount of steam to be supplied may be determined to be 2 moles according to the Reaction Formula 1. For example, if 1 mol of propane ($C_3H_8$) is contained in 1L of hydrocarbon gas, the amount of steam to be supplied may be determined to be 3 moles according to the Reaction Formula 1. This corresponds to the minimum amount of steam required for the reforming reaction of higher hydrocarbons in the first catalyst tube 200. Alternatively, a greater amount of steam than the minimum amount can be supplied.

The combustion unit 500 for supplying heat to the first catalyst tube 200 and the second catalyst tube 400 is installed in an upper center of the body 100. In the combustion unit 500, the hydrocarbon gas is combusted to generate combustion gas. The generated combustion gas is discharged to an outside through the center of the body 100.

Because the second catalyst tube 400 reacts at a higher temperature than the first catalyst tube 200, the combustion gas discharged from the combustion unit 500 first supplies heat to the second catalyst tube 400, and then supplies heat to the first catalyst tube 200. To this end, the second catalyst tube 400 is positioned radially inside the body 100 rather than the first catalyst tube 200. Referring to FIG. 2, the first catalyst tube 200 and the second catalyst tube 400 may include a plurality of first catalyst tubes 200 and a plurality of second catalyst tubes 400. The plurality of second catalyst tubes 400 are arranged at intervals in a circumferential direction of the body 100. FIG. 2 illustrates a case in which eight second catalyst tubes 400 are spaced apart from each other at regular intervals along the circumferential direction of the body 100, but it is understood that this is only an example and other exemplary embodiments are not limited thereto. Also, the plurality of first catalyst tubes 200 are spaced apart from each other along the circumferential direction of the body 100 and are disposed to surround the plurality of second catalyst tubes 400. The plurality of first catalyst tubes 200 and the plurality of second catalyst tubes 400 extend vertically along a longitudinal direction of the body 100.

The number of the first catalyst tubes 200 may be equal to the number of the second catalyst tubes 400, and the first catalyst tubes 200 and the second catalyst tubes 400 may be connected one-to-one. Therefore, the number of the intermediate tubes 300 is the same as the number of the first catalyst tubes 200 and as the number of the second catalyst tubes 400. For example, eight first catalyst tubes 200 are arranged to surround eight second catalyst tubes 400, and the eight first catalyst tubes 200 are connected to the eight second catalyst tubes 400 through eight intermediate tubes 300. However, it is understood that this is only an example and other exemplary embodiments are not limited thereto. Alternatively, the number of the second catalyst tubes 400 may be greater than the number of the first catalyst tubes 200 so that each first catalyst tube 200 may be connected to a plurality of second catalyst tubes 400.

Referring to FIG. 3, the first catalyst tube 200 has a U-curved portion 220. For example, each of the plurality of first catalyst tubes 200 extends vertically downward from an upper side of the body 100, then curves in a U shape at a lower end (i.e., U-curved portion 220), and then extends vertically upward. The number of U-curved portions 220 may be adjusted according to a catalyst reaction time. As the required catalyst reaction time increases, the number of U-curved portions 220 may increase.

It is preferable that the U-curved portion 220 extends along the circumferential direction of the body 100. That is, the vertically extending portions in each of the plurality of first catalyst tubes 200 are positioned at the same radial distance from the center of the body 100. Accordingly, the length of the first catalyst tube 200 can be adjusted according to the required catalyst reaction time, and a combined reforming apparatus can be formed in a compact configuration. In addition, each of the plurality of second catalyst tubes 400 may also have a U-curved portion.

Referring to FIG. 2, a first wall 120 and a second wall 140 are provided in the body 100. The first and second walls 120 and 140 guide the flow of the combustion gas discharged from the combustion unit 500 to effectively supply heat to the first catalyst tubes 200 and the second catalyst tubes 400. The first wall 120 is provided between the first catalyst tube 200 and the second catalyst tube 400, and extends vertically upward from the lower side of the body 100. The second wall 140 is disposed inside the second catalyst tube 400 in the radial direction, and extends vertically downward from the upper side of the body 100. Accordingly, the combustion gas discharged from the combustion unit 500 flows in a zigzag direction along the longitudinal direction of the first catalyst tube 200 and the second catalyst tube 400, thereby supplying sufficient heat to the first and second catalyst tubes 200 and 400 and generating a temperature gradient in the first and second catalyst tubes 200 and 400. The first catalyst tube 200 and/or the second catalyst tube 400 may be provided with fins to improve heat transfer efficiency.

Referring to FIG. 1, the combustion gas discharged from the combustion unit 500 flows downward, passes through a space under the second wall 140, flows through the second catalyst tube 400, and flows upward to supply heat to the second catalyst tube 400. Thereafter, the combustion gas that is slightly cooled to heat the second catalyst tube 400 passes a space above the first wall 120 and flows toward the first catalyst tube 200 to provide heat to a next first catalyst tube 200. After supplying heat to the first catalyst tube 200 and the second catalyst tube 400, the combustion gas is discharged to the outside by the combustion gas discharge unit 600 provided in the body 100.

As described above, the hydrocarbon gas sequentially flows through the first catalyst tube 200 and the second catalyst tube 400 and may be reformed into synthesis gas through steam reforming. The synthesis gas discharge unit 700 for discharging synthesis gas is connected to the second catalyst tube 400. The synthesis gas discharge unit 700 may collect the synthesis gas generated by the plurality of second catalyst tubes 400 and discharge the synthesis gas to the outside.

Figure 4:
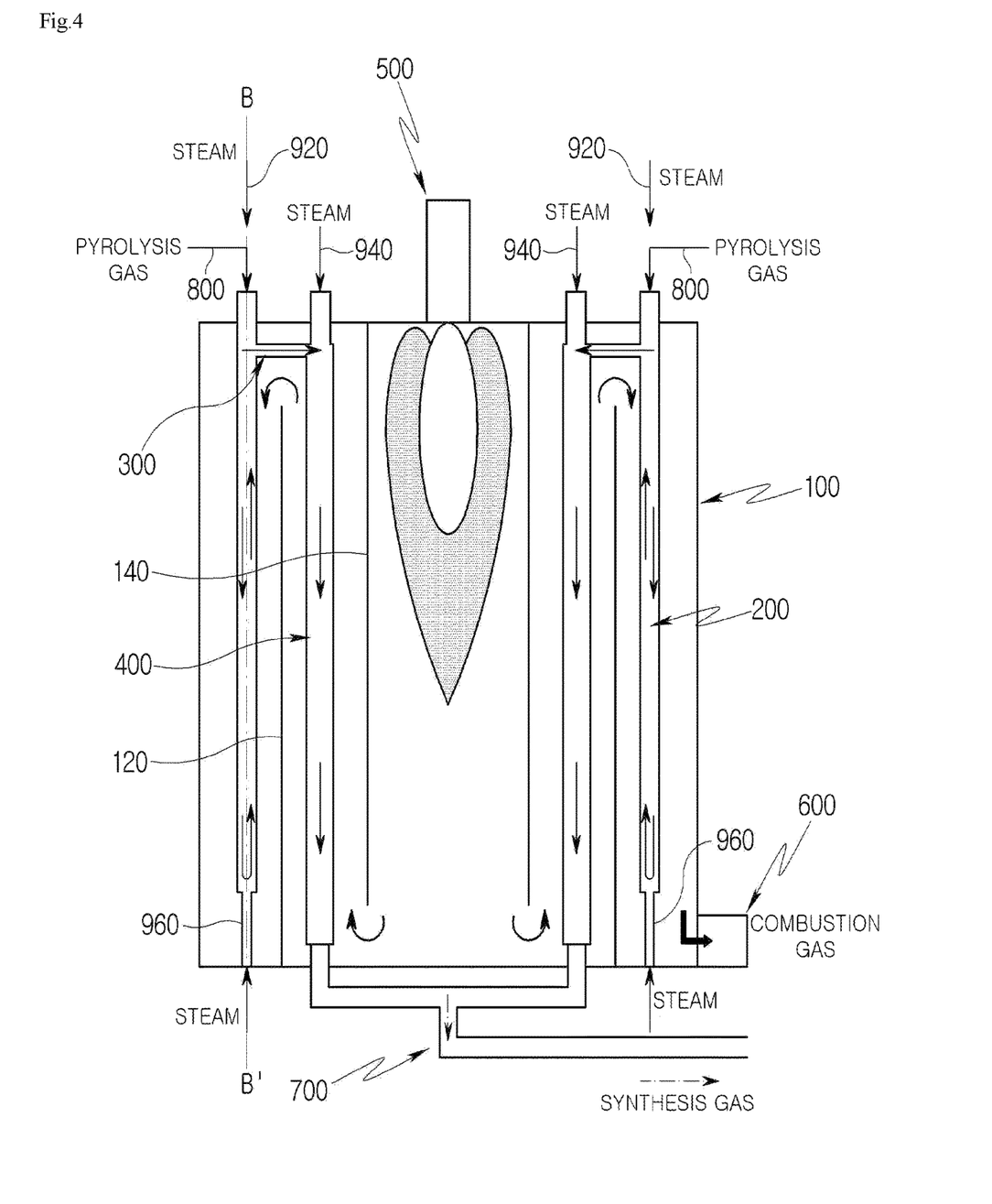
FIG. 4 is a cross-sectional view illustrating a combined reforming apparatus according to a second exemplary embodiment.
Figure 5:
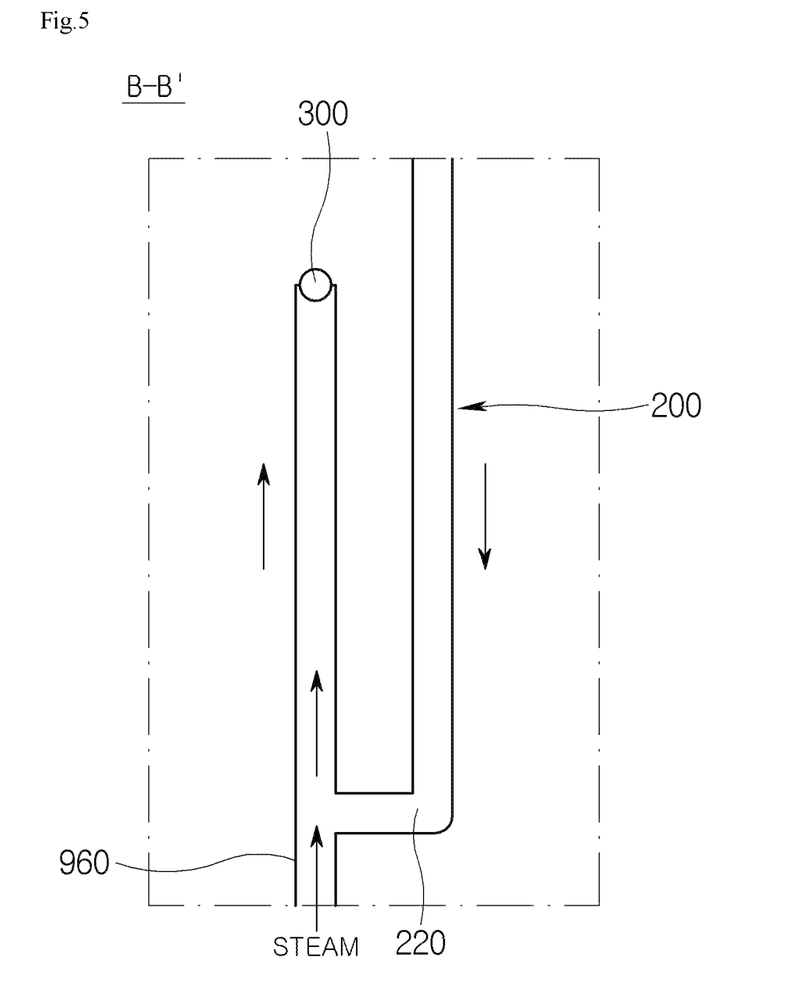
FIG. 5 is a cross-sectional view taken along line B-B' of FIG. 4.

FIG. 4 is a combined reforming apparatus according to a second exemplary embodiment, and FIG. 5 is a cross-sectional view taken along line B-B' of FIG. 4.

Referring to FIGS. 4 and 5, because the combined reforming apparatus according to the second exemplary embodiment has the same structure as the combined reforming apparatus according to the first exemplary embodiment except for a third steam supply pipe 960 for supplying steam to the first catalyst pipe 200 in a flow direction of gas passing through a U-curved portion, a redundant description of the same configuration will be omitted. Accordingly, if the first catalyst tube 200 is formed in a U-shape, steam may be supplied to the first catalyst tube 200 so as not to interfere with the flow of hydrocarbon gas. To this end, as illustrated in FIG. 5, the third steam supply pipe 960 may be connected to an outlet side of the U-curved portion 220 of the first catalyst tube 200.

Figure 6:
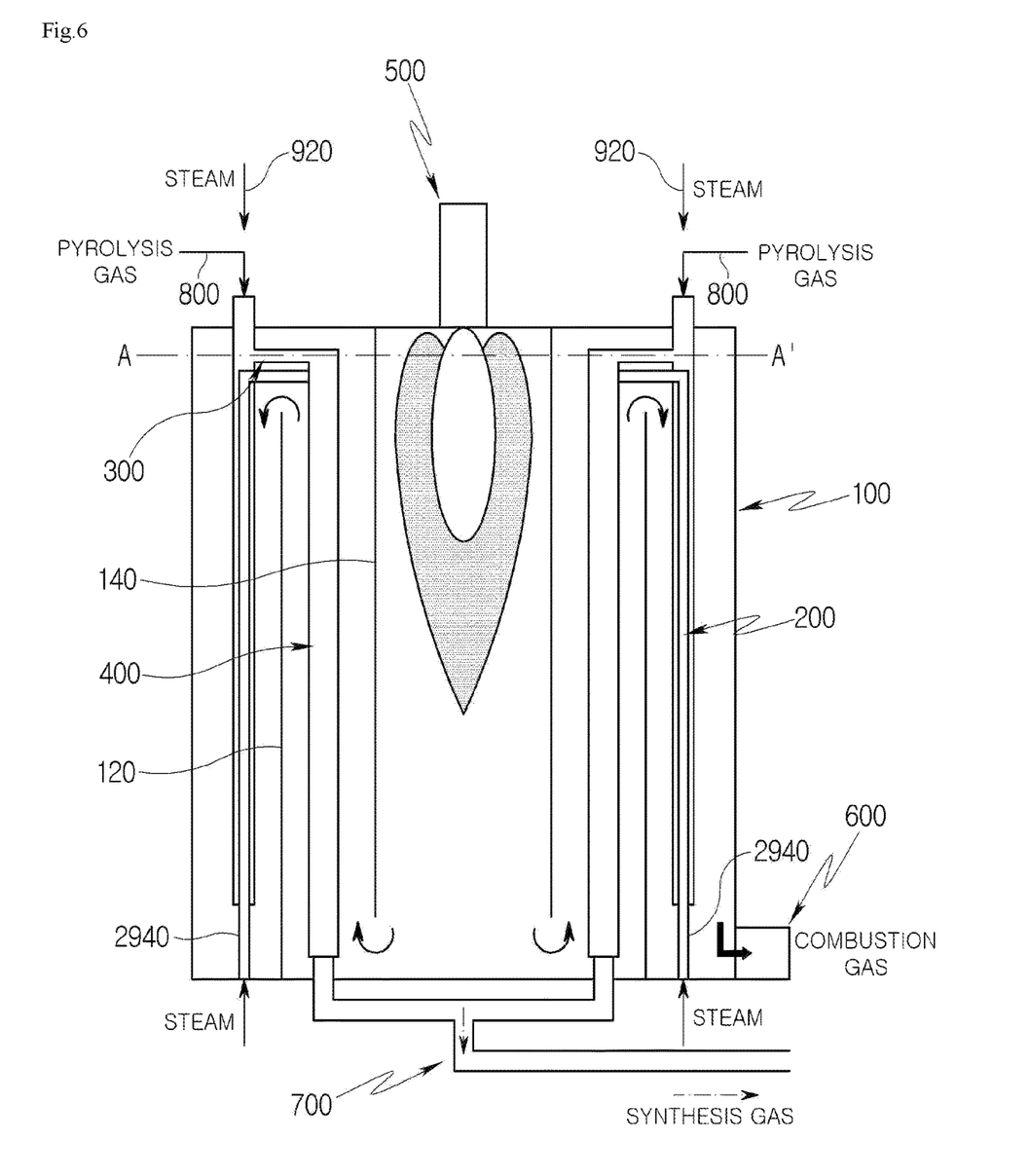
FIG. 6 is a cross-sectional view illustrating a combined reforming apparatus according to a third exemplary embodiment.
Figure 7:
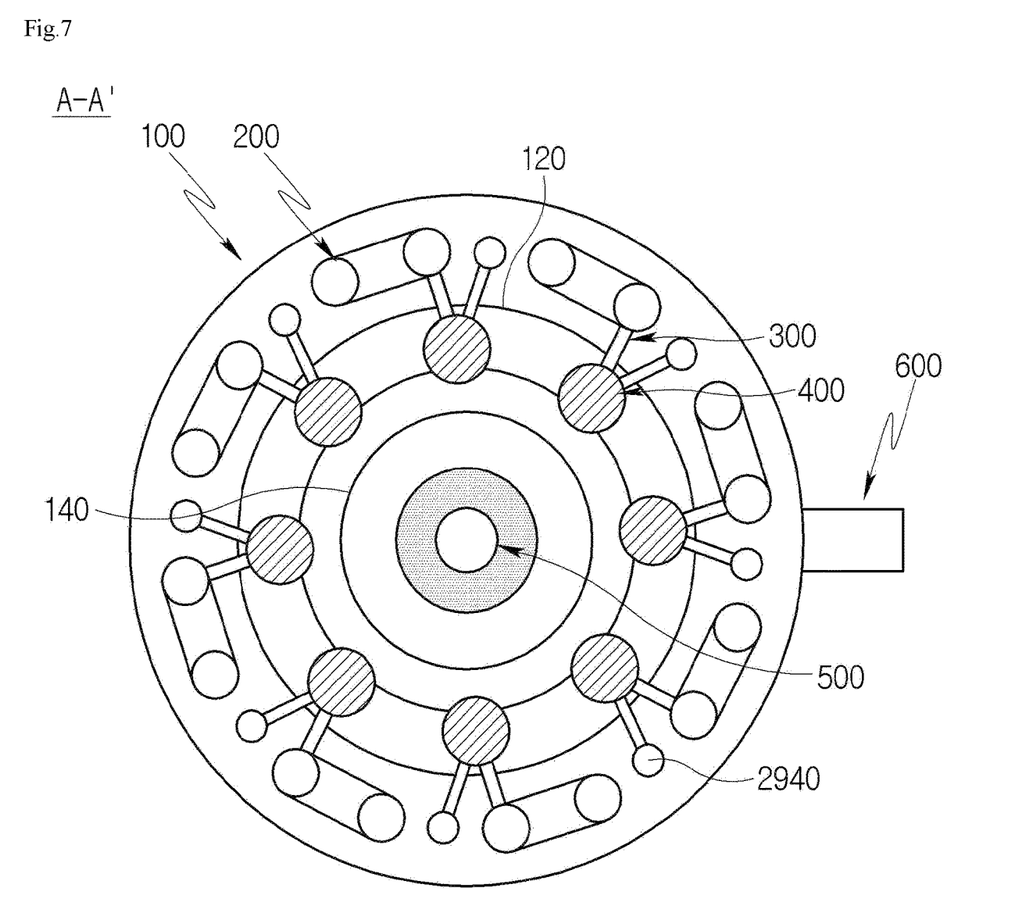
FIG. 7 is a cross-sectional view taken along line A-A' of FIG. 6.

FIG. 6 is a combined reforming apparatus according to a third exemplary embodiment, and FIG. 7 is a cross-sectional view taken along line A-A' of FIG. 6.

Referring to FIGS. 6 and 7, because the combined reforming according to the third exemplary embodiment has the same structure as the combined reforming apparatus according to the first exemplary embodiment except for the second steam supply pipe 2940, a redundant description of the same configuration will be omitted. Here, the second steam supply pipe 2940 is connected to the second catalyst tube 400, is disposed inside the body 100, and extends in a longitudinal direction of the body 100. For example, the second steam supply pipe 2940 extends in parallel with the first catalyst tube 200 along the longitudinal direction of the body 100 and is connected to an inlet side of the second catalyst tube 400. The second steam supply pipe 2940 may include a plurality of second steam supply pipes 2940, and the plurality of second steam supply pipes 2940 may be alternately arranged with the plurality of first catalyst tubes 200. Accordingly, steam supplied to the second catalyst tube 400 is heated by combustion gas and supplied to the second catalyst tube 400. Therefore, a temperature difference between hydrocarbon gas flowing through the first catalyst tube 200 and hydrocarbon gas flowing through the second catalyst tube 400 can be reduced.

According to one or more exemplary embodiments, because two or more catalyst tubes reacting at different temperatures are disposed in a single body, hydrocarbons ($C_xH_y$) having two or more carbon atoms can be reformed into methane ($CH_4$) and the methane ($CH_4$) can be reformed into synthesis gas composed of hydrogen ($H_2$) and carbon monoxide (CO) at the same time. Accordingly, there is no need to additionally install a preliminary reformer, thereby simplifying the structure and process for gas reforming.

In addition, instead of supplying steam required for reforming the hydrocarbon gas at once, only the amount of steam required for reforming is supplied to the first catalyst tube according to the content of hydrocarbons having two or more carbon atoms included in the hydrocarbon gas. This reduces the flow rate of the gas passing through the first catalyst tube and increases the retention time of the gas, thereby improving reforming efficiency.

Further, one or more exemplary embodiments can be used for reforming pyrolysis gas generated during pyrolysis of wastes in which the pyrolysis gas contains a large amount of hydrocarbons having two or more carbon atoms.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A combined reforming apparatus comprising:
    a body;
    a first catalyst tube disposed inside the body and reacting at a first temperature to reform hydrocarbons having two or more carbon atoms into methane ($CH_4$);
    a second catalyst tube disposed inside the body, connected to the first catalyst tube, and reacting at a second temperature higher than the first temperature to reform methane ($CH_4$) into synthesis gas comprising hydrogen ($H_2$) and carbon monoxide (CO);
    a combustion unit configured to supply heat to the first and second catalyst tubes;
    a gas supply pipe configured to supply hydrocarbon gas to the first catalyst tube;
    a first steam supply pipe configured to supply steam to the first catalyst tube; and
    a second steam supply pipe configured to supply steam to the second catalyst tube.

2. The combined reforming apparatus according to claim 1,
    wherein the first steam supply pipe is configured to supply an amount of steam to the first catalyst tube, the amount of steam being determined according to a content of hydrocarbons having two or more carbon atoms included in the hydrocarbon gas received and contained by the first catalyst tube.

3. The combined reforming apparatus according to claim 1,
    wherein the gas supply pipe is configured to supply the hydrocarbon gas, which is pyrolysis gas generated through pyrolysis of waste.

4. The combined reforming apparatus according to claim 1,
    wherein the first catalyst tube has a U-curved portion.

5. The combined reforming apparatus according to claim 4, further comprising:
    a third steam supply configured to supply steam to the first catalyst tube in a flow direction of gas passing through the U-curved portion of the first catalyst tube.

6. The combined reforming apparatus according to claim 5, wherein the third steam supply pipe is connected to an outlet side of the U-curved portion of the first catalyst tube.

7. The combined reforming apparatus according to claim 5,
    wherein the U-curved portion extends along a circumferential direction of the body.

8. The combined reforming apparatus according to claim 1,
    wherein the second steam supply pipe is connected to the second catalyst tube, is disposed in the body, and extends in a longitudinal direction of the body.

9. The combined reforming apparatus according to claim 8,
    wherein combustion gas discharged from the combustion unit is discharged through a center portion of the body.

10. The combined reforming apparatus according to claim 9, wherein the second catalyst tube is radially more inner than the first catalyst tube.

11. The combined reforming apparatus according to claim 10,
    wherein the first catalyst tube and the second catalyst tube are arranged in parallel along the longitudinal direction of the body, and
    a first wall extending from a first side of the body is disposed between the first catalyst tube and the second catalyst tube.

12. The combined reforming apparatus according to claim 11,
    wherein a second wall extending from a second side of the body is disposed more inward than the second catalyst tube.

13. The combined reforming apparatus according to claim 10,
wherein the first catalyst tube includes a plurality of first catalyst tubes and the second catalyst tube includes a plurality of second catalyst tubes.

14. The combined reforming apparatus according to claim 13,
wherein the plurality of second catalyst tubes are arranged at intervals along a circumferential direction of the body, and
the plurality of first catalyst tubes are arranged to surround the plurality of second catalyst tubes.

15. The combined reforming apparatus according to claim 14,
wherein the second steam supply pipe includes a plurality of second steam supply pipes alternately arranged with the plurality of first catalyst tubes.

16. The combined reforming apparatus according to claim 1, wherein the second steam supply pipe extends in parallel with the first catalyst tube along the longitudinal direction of the body and is connected to an inlet side of the second catalyst tube.

17. The combined reforming apparatus according to claim 16, wherein steam supplied to the second catalyst tube is heated by combustion gas and then supplied to the second catalyst tube.

* * * * *